United States Patent [19]
Glaesener

[11] Patent Number: 5,776,402
[45] Date of Patent: *Jul. 7, 1998

[54] INJECTION MOLDING MACHINE HAVING A UNIFORMLY COMPRESSIBLE PLATEN AND PROCESS FOR PREVENTING FLASH FORMATION

[75] Inventor: Pierre Glaesener, Bissen, Luxembourg

[73] Assignee: Husky Injection Molding Systems Ltd., Canada

[*] Notice: The term of this patent shall not extend beyond the expiration date of Pat. No. 5,593,711.

[21] Appl. No.: 742,660

[22] Filed: Nov. 4, 1996

Related U.S. Application Data

[63] Continuation-in-part of Ser. No. 482,874, Jun. 7, 1995, Pat. No. 5,593,711.

[51] Int. Cl.$^6$ .................... B29C 45/64; B30B 15/06
[52] U.S. Cl. .................... 264/239; 264/328.9; 100/295; 425/589; 425/406; 425/450.1
[58] Field of Search ................ 264/161, 239, 264/319, 328.1, 328.9; 425/589, 595, 450.1, 451.9, 470, 472, 406, 411; 100/295, 258 R, 258 A

[56] References Cited

U.S. PATENT DOCUMENTS

| | | | |
|---|---|---|---|
| 1,977,549 | 10/1934 | Glasner | 100/258 R |
| 2,719,443 | 10/1955 | Derbyshire | 100/295 |
| 2,807,206 | 9/1957 | Saives | 100/258 A |
| 3,669,593 | 6/1972 | Cyriax | 425/589 |
| 4,243,369 | 1/1981 | James | 425/589 |
| 4,576,092 | 3/1986 | Yamato | 100/295 |
| 4,589,836 | 5/1986 | Fjellman | 425/411 |
| 4,615,857 | 10/1986 | Baird. | |
| 5,066,217 | 11/1991 | Fukuzawa et al. | |
| 5,100,283 | 3/1992 | Bluml et al. | |
| 5,162,782 | 11/1992 | Yoshioka. | |
| 5,163,363 | 11/1992 | Gilgert et al. | 100/258 R |
| 5,188,850 | 2/1993 | Hirata et al. | |
| 5,192,557 | 3/1993 | Hirata et al. | |
| 5,547,367 | 8/1996 | Stein | 100/258 A |
| 5,593,711 | 1/1997 | Glaesener | 100/295 |

FOREIGN PATENT DOCUMENTS

| | | |
|---|---|---|
| 0192814 | 9/1986 | European Pat. Off. . |
| 2284433 | 4/1976 | France . |
| 4004026 | 8/1990 | Germany . |
| 9211991 | 7/1992 | WIPO . |

*Primary Examiner*—Jill Heitbrink
*Attorney, Agent, or Firm*—Bachman & LaPointe, P.C.

[57] ABSTRACT

An injection molding machine includes a stationary platen having a first mold half, at least one movable platen having a second mold half for forming a mold with the first mold half, tie bars for guiding the movable platen relative the stationary platen, and an injection unit for injecting molten resin into the mold. For at least one of the stationary and movable platen, a force is generated during clamping having a first direction. The at least one stationary and movable platens includes a first wall having edges and a central area and at least first and second sides, wherein the first side is adapted to be positioned nearest the clamping operation. The platen further includes a second wall spaced from and substantially parallel to the first wall, wherein the first and second walls extend substantially transverse to the first direction of the force. An intermediate support structure is positioned between the walls and is used to direct the force from the edges of the first wall toward the central area of the first wall for substantially preventing non-uniform deflection of the first wall along the first side. A related process for preventing flash formation is also disclosed.

66 Claims, 6 Drawing Sheets

INJECTION MOLDING MACHINE HAVING A UNIFORMLY COMPRESSIBLE PLATEN AND PROCESS FOR PREVENTING FLASH FORMATION

CROSS REFERENCE TO RELATED APPLICATION

This application is a continuation-in-part of the application having the Ser. No. 08/482,874, filed Jun. 7, 1995, by Pierre Glaesener, now U.S. Pat. No. 5,593,711.

BACKGROUND OF THE INVENTION

The present invention is directed to injection molding machines, and more particularly, to an injection molding machine having a platen having a design which allows for minimum platen deflection at minimum platen weight.

Injection molding machine platens are typically block shaped as shown in U.S. Pat. No. 5,188,850 to Hirata et al.; U.S. Pat. No. 5,066,217 to Fukuzawa et al.; U.S. Pat. No. 5,110,283 to Blüml et al.; U.S. Pat. No. 5,162,782 to Yoshioka; and U.S. Pat. No. 5,192,557 to Hirata et al. In each of these patents, the mold platen is substantially block shaped having a substantially rectangular side which supports a mold half. During clamp-up of mold halves, a force is generated against the mold mounting face of the platen. As is typical with such block shaped platens, the mold mounting face is caused to concavely deform, forcing the top and bottom edges of the side towards the oncoming force and causing the platen to bend and provide tension across the backside of the mold platen. As a result, under the clamp-up force the center of the platens separate causing a gap between the mold halves, and in some cases, the formation of flash is a by-product.

U.S. Pat. No. 4,615,857 to Baird discloses an encapsulation means and method for reducing flash during mold operations. In accordance with this device, it is alleged that injection and transfer molding of plastic is performed in a manner that virtually eliminates flash. Deflection of the mold press therein is measured with the mold press in the clamping configuration. The support structure of the mold is arranged to apply an equal force to the mold face by configuring supporting pillars and bars such that they act as individual springs against the mold face and in response to the force generated while the mold is in the clamping configuration. The spring constants and the lengths of the supporting pillars and bars are calculated to account for the actual deflection found in the mold press and thereby producing a uniform pressure on the molds during clamping of the press.

Accordingly, the flexure of the mold platens during mold sealing is measured and the compressibility of the mold mounting blocks of the device are adjusted as a function of lateral position on one or both platens in order to compensate for platen flexure, so that a constant force is applied to the parting surface of the mold, independent of lateral position on the parting surface. The stiffness and length of the mounting blocks define the force provided by the mounting blocks and are determined in accordance with predetermined formulas depending upon the position of the block on the platen and the predetermined platen deflection. While Baird compensates for deflection, the method and apparatus by which this is achieved is quite complex requiring individual designs for particular forces to be generated with particular molds. Accordingly, a uniformly applicable design is not achieved.

Figure 1A:
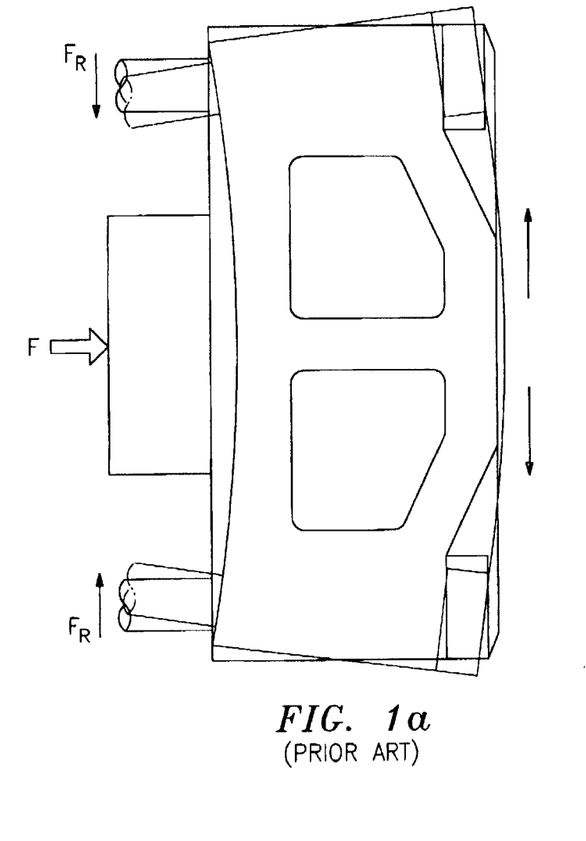
FIG. 1a is a side elevational view of a mold platen of the prior art and the forces and deflections which take place during a clamp-up using this mold platen.
Figure 1B:
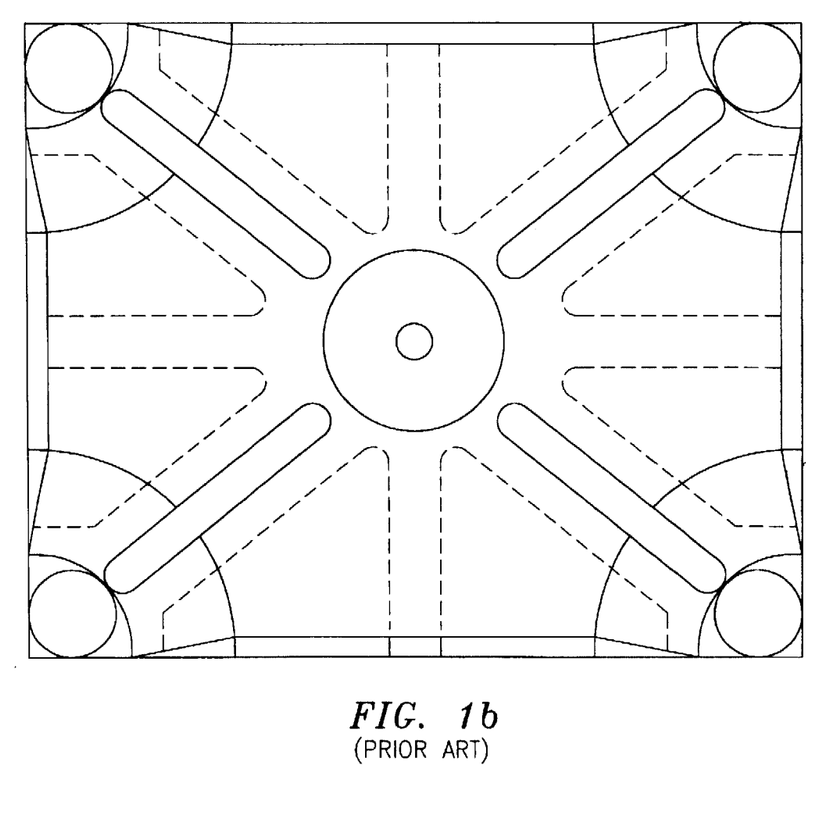

FIGS. 1a and 1b disclose a prior art molding platen having a shape slightly different than the block shape platens discussed above in the cited patents. As shown in FIG. 1a, the mold platen has a profile including several openings therethrough, a front wall and a back wall. As shown in FIG. 1b, a plurality of slots and ribs extend toward the back wall which can and has a smaller surface area than the front wall of the platen. The platen also includes bores at each corner thereof for receiving tension bars that resist the force F between the platens during mold clamp-up. Each tie bar carries a resistance force $F_R$ as shown. The plurality of ribs and slots are provided for decreasing the weight of the platen. That is, the front mold mounting face is under compression during mold clamp-up while the back wall is under tension as in a simple beam. The tie bars are drawn inwardly and deform to conform with platen face movement, as shown by the dotted line and arrows in FIG. 1a, thereby causing the mold face to bend and have a concave configuration during molding, similar to the platens of the aforementioned patents. Accordingly, despite the design of the mold platen of FIGS. 1a and 1b, mold face bending is not compensated for and the possibility of the creation of flash is still existent. Since both sides of the platen bend, the supports at the corners of the tie bars also bend resulting in uneven loading of the tie bar supports. This causes bending of the tie bars and high stress concentrations leading to premature fatigue failure. Arrows C show how the tie bars are bent during clamp-up.

There exists, therefore, a need for an injection molding machine having a simply designed and lightweight platen which includes means for compensating for platen deflection during mold or press clamp-up and which substantially eliminates the creation of flash, during injection molding.

SUMMARY OF THE INVENTION

The primary object of this invention is to provide an injection molding machine having a mold platen designed such that substantially flat and parallel mold mounting faces result during clamp-up.

Another object of this invention is to provide a mold platen for use with an injection molding as above which is also lightweight.

Still another object of this invention is to provide an injection molding machine having a mold platen designed to direct clamping force during clamp-up from the tie bars at the edges of the platen towards the central mold mounting area of the platen eliminating any curvature of the platen.

Still another object of this invention is to provide an injection molding machine which includes a mold platen having a mold mounting face which stays almost completely flat during clamp-up and substantially prevents the formation of flash.

And still a further object of this invention is to provide an injection molding machine which uses a mold platen having two walls and an intermediate support structure which prevents the mold platen from non-uniformly deflecting at the molding side during clamp-up.

And yet another object of this invention is to provide an injection molding machine which uses a mold platen having two walls and a central arch-shaped intermediate support structure between the two walls which substantially prevents non-uniform platen deflection at the molding side.

And yet another object of this invention is to provide an injection molding machine which uses a mold platen having two walls and an intermediate conically-shaped support structure for substantially preventing non-uniform platen deflection at the molding side.

Another object of the present invention is to provide an injection molding machine which uses a mold platen for eliminating uneven loading of tie bars and nuts during clamp-up.

3

Yet another object of this invention is to provide a method for substantially eliminating the formation of flash during mold clamp up while injection molding.

The foregoing objects are achieved by the injection molding machine of the present invention. The machine includes a stationary platen having a first mold half, at least one movable platen having a second mold half for forming a mold with said first mold half, means for guiding said movable platen relative said stationary platen, and means for injecting molten resin into said mold. For at least one of the stationary and movable platens, a force is generated having a first direction. The platen includes a first wall having edges and a central area and first and second sides, wherein the first side is adapted to be positioned nearest the clamping operation. The platen further includes a second wall spaced from and substantially parallel to the first wall, wherein the first and second walls extend substantially transverse to the first direction of the force. Means for directing the force from the edges of the first wall toward the central area of the first wall is provided for substantially preventing non-uniform deflection of the first wall along the first side. The purpose of the second wall is to resist the separation forces created by the intermediate structure.

The details of the present invention are set out in the following description and drawings wherein like reference characters depict like elements.

BRIEF DESCRIPTION OF THE DRAWINGS

FIG. 1b is a front elevational view of the mold platen of the prior art shown in FIG. 1a;

DETAILED DESCRIPTION OF THE PREFERRED EMBODIMENT

Figure 2A:
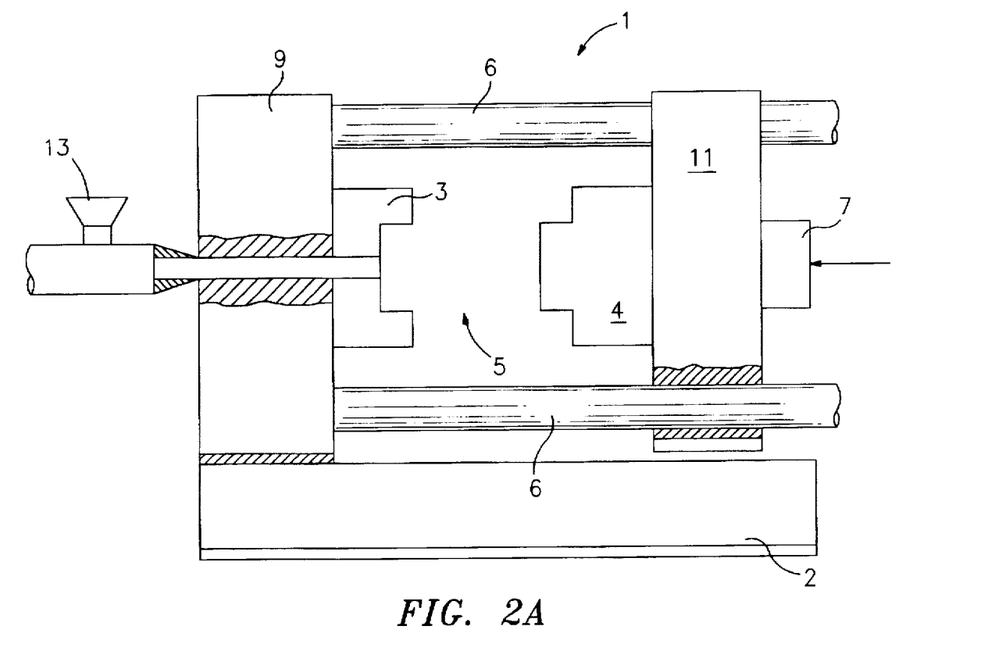
FIGS. 2A and 2B are perspective views of an injection molding machine in accordance with the principles of the present invention and which uses a platen in accordance with FIGS. 3–6.

Referring now to the drawings in detail, there is shown in FIG. 2A, an injection molding machine 1 which uses at least one uniformly compressible platen in accordance with the principles of the present invention. Injection molding machine 1 includes a base 2, a stationary platen 9 and at least one movable platen 11, either of which or both can be the uniformly compressible platen in accordance with the principles of the present invention. Stationary platen 9 includes a first mold half 3 and movable platen 11 includes a second mold half 4, wherein the first and second mold halves form a mold 5 secured by clamping means 7. Movable platen 11 is movable relative base 2 and is guided via tie bars 6. Injection unit 13 is also provided for injecting molten resin into mold 5, in accordance with known principles. Alternatively, as shown in FIG. 2B, the tie bars may be omitted and movable platen 11 slides on rail 15 via sliding support means 17.

Figure 2B:
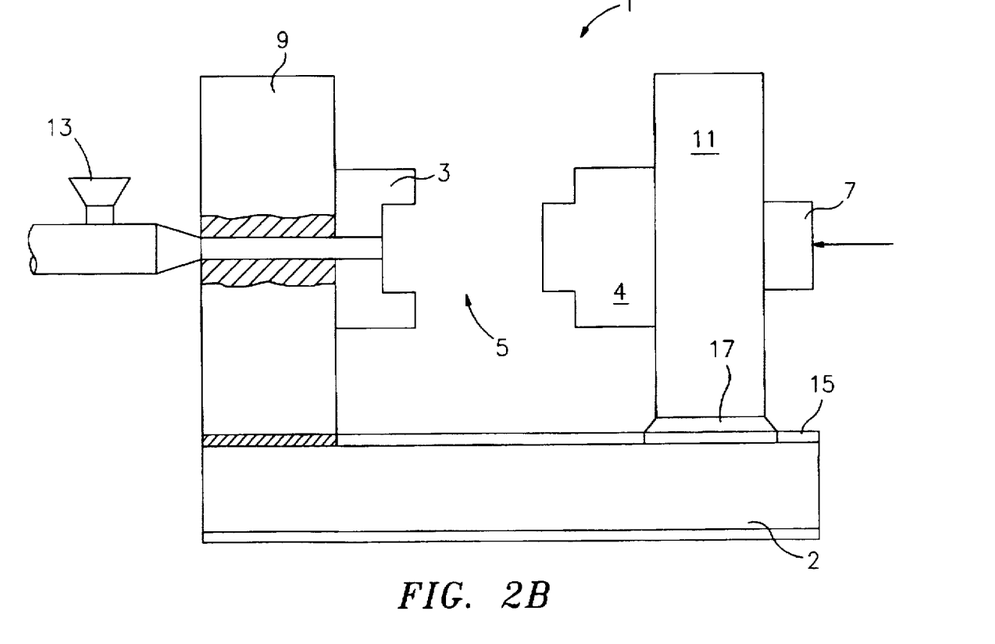

Platens 9 and 11 are shown schematically in FIG. 2. However, at least one of the movable and stationary platens is a substantially uniformly compressible platen in accordance with the detailed description of the same set forth below in conjunction with FIGS. 3–6. Accordingly upon clamp-up for injection molding, at least one or both of stationary platen 9 and movable platen 11 functions to direct forces from the edges of the wall facing the molding area toward the central area thereof, as described in detail below, for substantially preventing non-uniform deflection of at least one of the movable and stationary platens.

Stationary platen 9 is described in detail below, it being understood that the same description is substantially applicable to movable platen 11, where in the preferred embodiment, both of the platens of the injection molding machine 1 are designed in accordance with a uniformly compressible platen.

Figure 3:
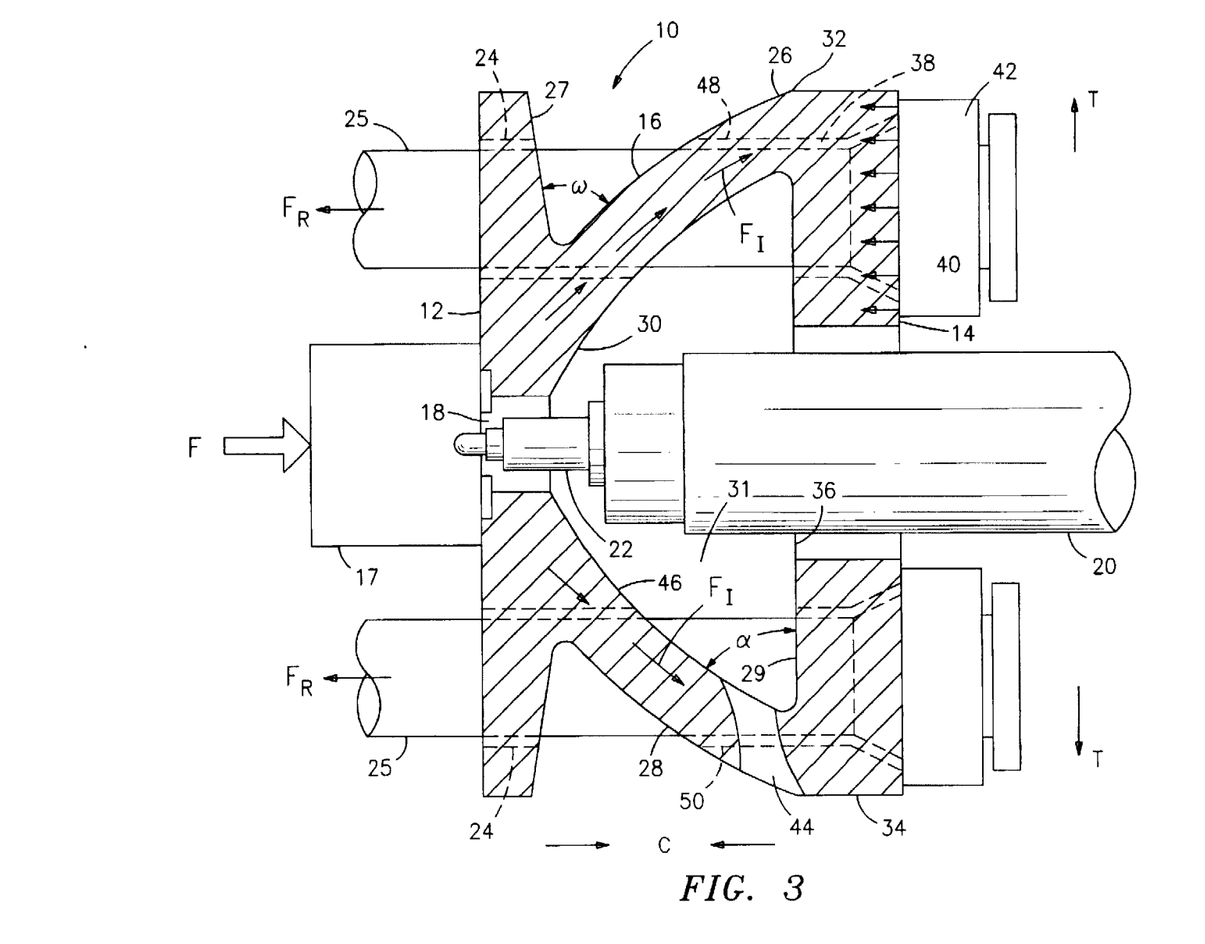
FIG. 3 is an elevational sectional view of the platens of FIGS. 4 and 6 in accordance with the principles of the present invention.
Figure 4:
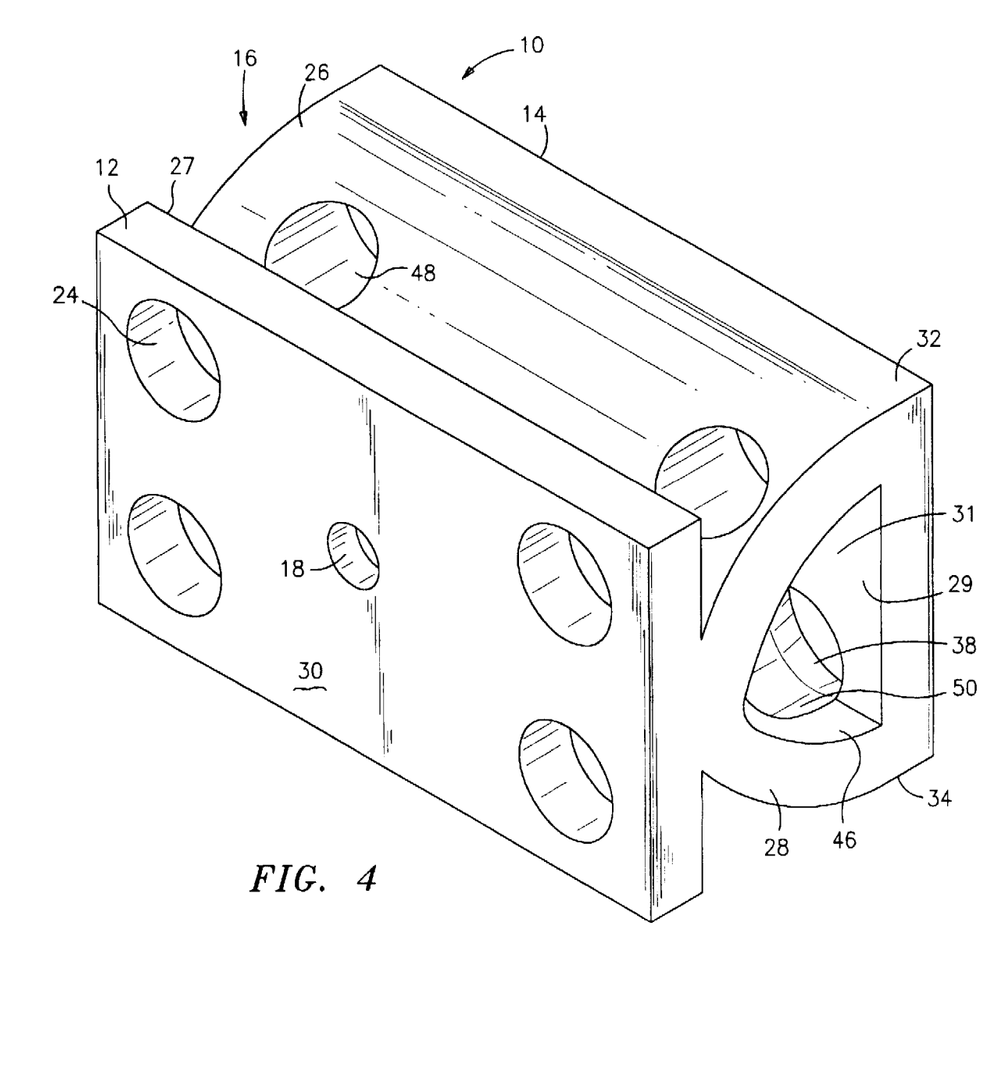
FIG. 4 is a perspective view of the platen of FIG. 3.

Referring further to the drawings in detail, there is shown in FIG. 3, an elevational and cross sectional view of a first embodiment of the platen 10 of the present invention for use in a molding application, preferably injection molding in combination with the machine shown in FIG. 2 and described above, and in FIG. 4, a perspective view of the platen shown in FIG. 3. Generally, platen 10 includes a mold mounting wall 12 adapted to hold a mold half 17, an end wall 14 and intermediate support structure 16 positioned between molding wall 12 and end wall 14.

Figure 5:
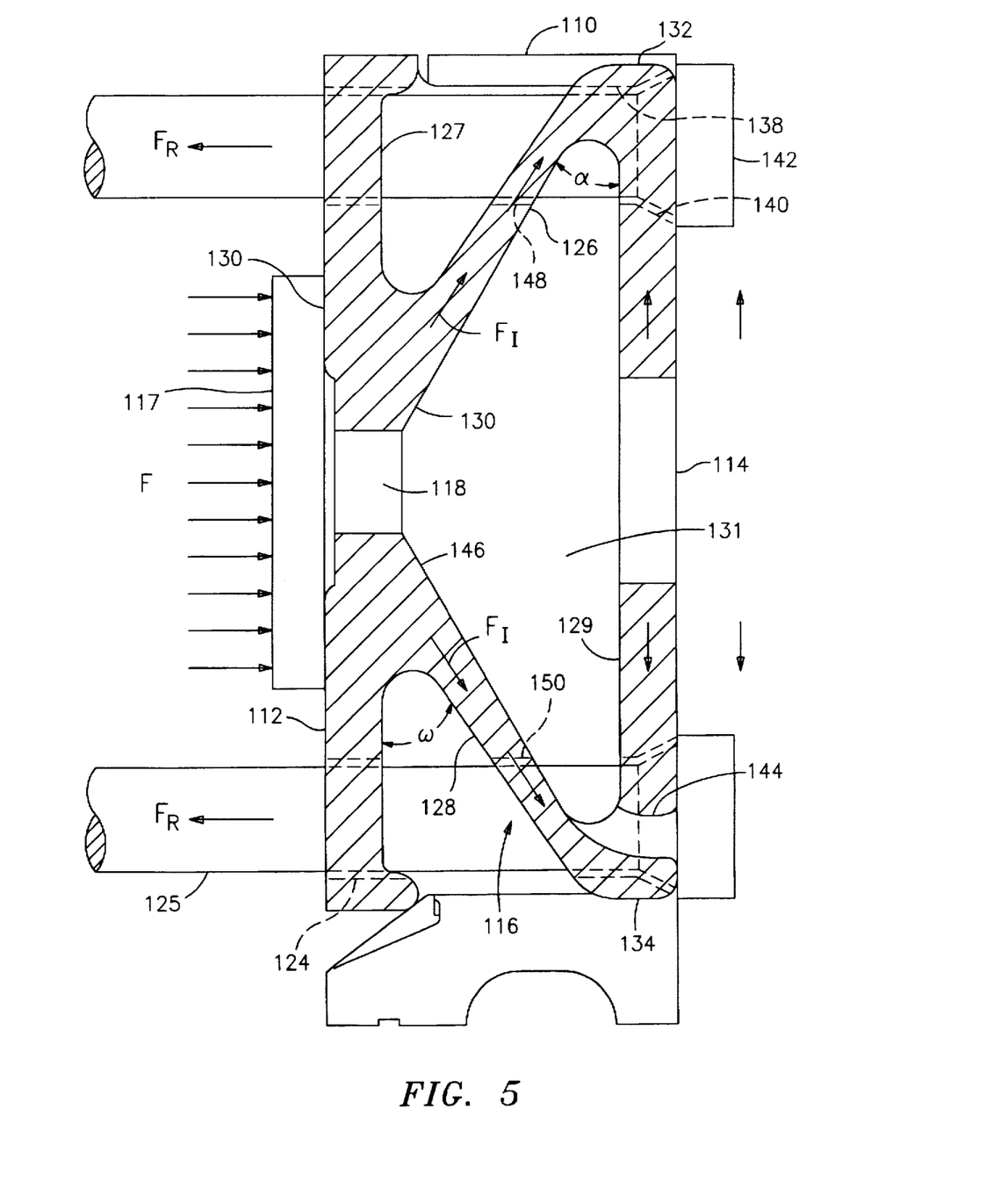
FIG. 5 is an elevational sectional view of another embodiment of a platen in accordance with the principles of the present invention.
Figure 6:
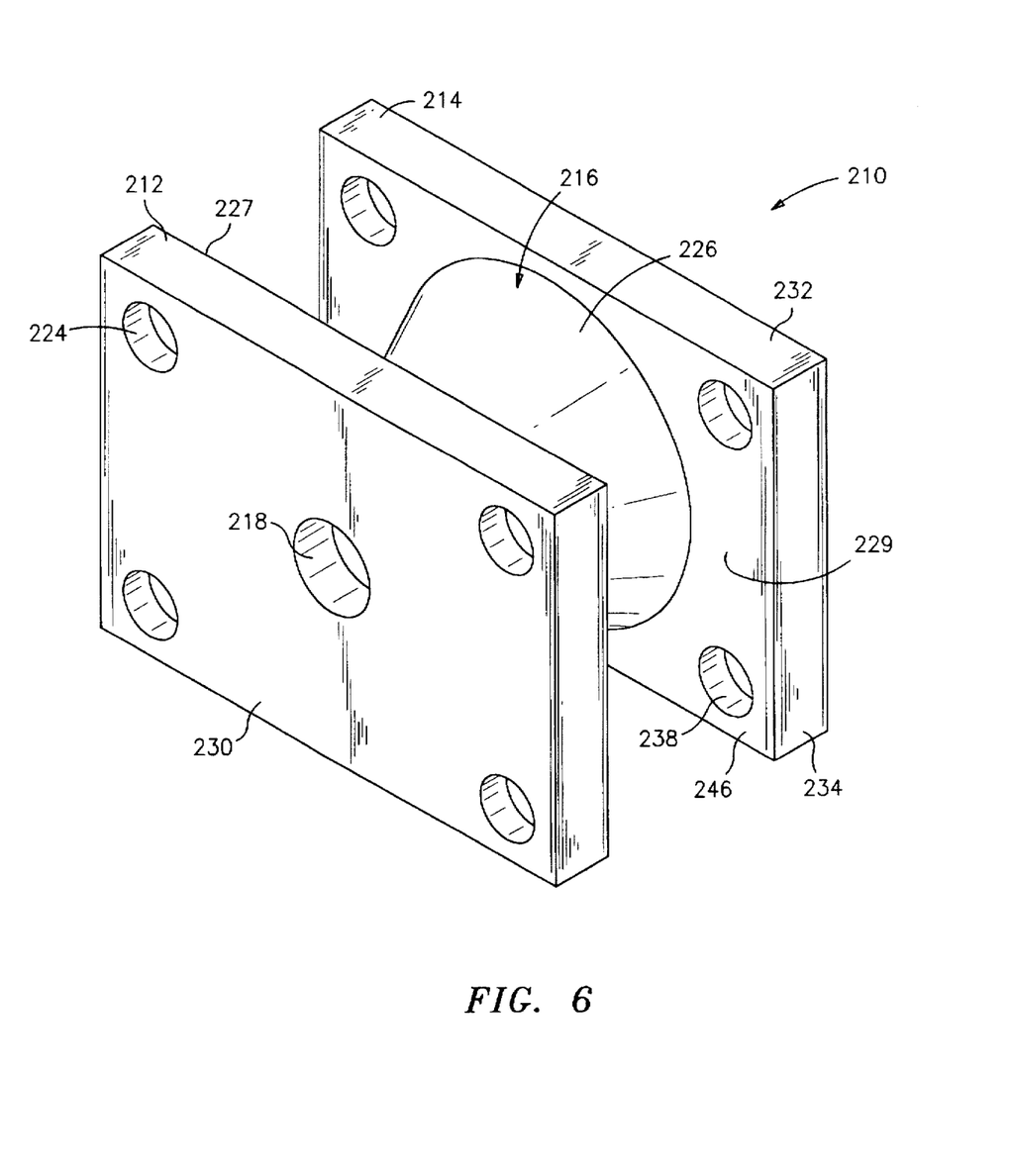
FIG. 6 is a perspective view of another embodiment of a platen in accordance with the principles of the present invention.

FIGS. 5 and 6 represents additional embodiments of the platen of the present invention and from a general standpoint, the embodiments of FIGS. 3, 5 and 6 are similar. FIG. 5 represents the particularly preferred embodiment, i.e. one with angled instead of arched walls or one having a conically shaped intermediate portion, as shown in FIG. 6. The foregoing and following description, unless otherwise indicated, applies equally to all embodiments and with regard to the figures, like numerals designate like elements.

Mold mounting wall 12 is adapted to hold a mold half 17 for use in mating another mold half (not shown) for creating a mold and for sufficiently clamping the other mold half via clamping force F represented by the arrows. Reaction forces $F_R$ in tie bars 25 are further represented by the arrows. Mold mounting wall 12 is substantially rectangular in shape, although other shapes can be used, extends substantially transverse to force F, and preferably, on one of two platens on a machine, includes an aperture 18 through the center thereof for insertion of an injection unit 20. As shown in the cross-sectional view of FIG. 3, the tip 22 of injection unit 20 preferably extends through aperture 18 to connect with mold half 17 thereby contributing to efficient space utilization. Mold mounting wall 12 also includes a bore 24 being substantially larger in diameter than tie bar 25 at each corner thereof for receiving tie bars 25. Mold mounting wall 12 is adapted to receive four tie bars 25 which extend therethrough and toward end wall 14.

Intermediate support structure 16 provides a mechanism by which mold mounting wall 12 of platen 10 is prevented from non-uniformly bending during the application of clamping force F and as a result of such non-uniform bending, preventing the creation of flash and wear on the components of the molding machine.

Intermediate support structure 16 includes one or more internal ribs 26 and/or 28 extending from inner side 27 of mold mounting wall 12 to inner side 29 of end wall 14, causing the intermediate support structure to have a narrow end and a wide end. For the FIG. 6 embodiment, the intermediate support structure is preferably one continuous wall in a semi-spherical or conical shape which is attached to the end wall and mold mounting wall similar to as described below with respect to the upper and lower ribs.

Ribs 26 and 28 are attached to and extend substantially outwardly from a central area 30 of inner side 27 of mold mounting wall 12, forming a narrow end, to the outer edges, 32 and 34, respectively, of the inner side 29 of end wall 14, forming a wide end and cavity 31 between ribs 26 and 28. Accordingly, central area 30 is located opposite the intended mold mounting area of mold mounting wall 12. Ribs 26 and 28 therefore support the platen face directly where the mold is located. Accordingly, in one embodiment, a singular upper rib 26 extends from central area 30 of mold mounting wall 12 to, and is attached with, an upper edge 32 of inner side 29 of end wall 14. Preferably, upper rib 26 is attached to and extends across the entire width of inner side 27 of molding wall 12 as shown in the perspective view of FIG. 4, although this design may be deviated from as discussed below. Similarly, lower rib 28 is also attached to, and extends from central area 30, preferably along the entire width of inner side 27 of mold mounting wall 12 and is attached with the lower edge 34 of inner side 29 of wall 14. While ribs 26 and 28 have been described as substantially contiguous and extending across the entire width, the present invention also contemplates ribs 26 and 28 being comprised of a plurality of separate ribs having smaller widths and spaced from each other and not necessarily covering the entire width of the mold mounting and end walls.

With particular reference to FIG. 3 and the embodiment shown therein, the resulting structure formed by upper rib 26 and lower rib 28 is substantially arch or C-shaped, wherein each rib is bowed outwardly relative cavity 31 of platen 10.

Referring with particularity to FIG. 5 and the embodiment shown therein, upper rib 126 and lower rib 128 are substantially straight, extending from central area 130 to upper edge 132 and lower edge 134, respectively, of end wall 114. In this embodiment, the resulting shape is substantially V-shaped. The cross-section taken horizontally could be substantially the same to define another embodiment, i.e. such as the conical version shown in FIG. 6. As representative of the cross-section of the FIG. 6 embodiment, FIG. 5 would not include holes 124 and the portion of tie bars 125 seen in cavity 131 would not be seen since wall 226 would block the view.

With particular reference to FIG. 6, and the embodiment shown therein, intermediate support structure 216 comprises a wall 226 which is conical or spherical in shape with the narrow portion of the conical or spherical shape attached to the inner surface 227 of mold mounting wall 212 and the wide portion of the conical or spherical shape attached to the inner surface 229 of end platen 214. The conical or spherical wall may be divided into sections for ease of manufacture, or may be a singular cast part. Due to the conical or spherical shape, the wall 226 of intermediate 216 typically would not extend across the entire width of the end and mold mounting walls as described above for the FIGS. 3 and 5 embodiments.

In the FIGS. 3, 5 and 6 embodiments, the upper and lower ribs of the intermediate support structure or wall of the conically or spherically shaped support structure are attached with molding wall 12, 112, or 212, respectively, at an acute angle ω thereto (not shown in FIG. 6, but similar to FIG. 5) and to end wall 14, 114, or 214, respectively, at an acute angle α thereto (not shown in FIG. 6, but similar to FIG. 5).

End wall 14 is also preferably rectangular in shape, although other shapes may be used, and extends substantially parallel wall 12, transverse force F, and may include an aperture 36 therethrough in which injection unit 20 can be adapted to extend for injecting melt into mold half 17. Similar to molding wall 12, end wall 14 includes bores 38 in alignment with bores 24, one at each corner thereof, in order to receive tie bars therethrough. Each of bores 38 may include, if necessary, a countersink 40 for receiving tie bar nuts 42. Upper rib 26 and lower rib 28 may also include openings 48 and 50, respectively, therein and in alignment with bores 24 and 38 of walls 12 and 14 for receiving tie bars 25 as required. End wall 14 further can include purge openings 44 therein adjacent ribs 26 and 28, through which escaping melt, purgings and/or drool may exit from the platen by running down the inner surface 46 of lower rib 28 and through the purge opening 44.

While the platens as shown are formed from a cast material, it is also feasible that the elements thereof, i.e. the walls and intermediate support structure, may be formed separately and fastened together in any manner which will provide the necessary strength to withstand forces developed during clamp-up.

In operation, platen 10 and/or 11 is used, for example, preferably with both the movable and stationary platens of the injection molding machine of FIG. 2. Also, the platen may be used in molding machines and mechanical presses or other clamping mechanisms wherein deflection of a platen is possible due to clamp-up forces generated, and in both singular and tandem designs of these molding machines and presses and other clamping mechanisms.

During clamp-up in injection molding machine 1 while using at least one platen designed in accordance with platen 10, intermediate support structure 16 and the arrangement of mold mounting wall 12 relative intermediate support structure 16 is such that the clamping forces F at the edges of the platens are directed towards the center of the platen where the mold half is located, i.e functioning on a bridge principle to provide support directly under the mold. Accordingly, the mold mounting face of the platen deforms in a substantially parallel manner thereby substantially preventing bending and the creation of flash.

The force F which develops on the mold mounting surface of platen 10 during clamp-up is indicated by the large arrow in FIG. 3. The force F acting on the platen during mold clamp-up is dissipated outwardly as force $F_1$, as indicated by the small arrows, along internal ribs 26 and 28 causing the intermediate support structure 16 to be in compression as indicated by the arrows C and causing the molding face of wall 12 to be in a neutral state in terms of bending forces acting unopposed thereon. In addition, end wall 14 is caused to be in tension as indicated by arrows T while the tie bars each with reaction force $F_R$ are pushed slightly outwardly due to stretching of end wall 14. As a result of this action of forces on and within the platen, the mold mounting face of molding wall 12 is not non-uniformly deflected. The force distribution described above is applicable equally to each of the embodiments enclosed herewith, i.e. the arch or C-shaped intermediate support structure and the V-shaped intermediate support structure shown in FIGS. 3 and 5, respectively and also the conically or spherically shaped intermediate support structure shown in FIG. 6. Accordingly, the formation of flash as a result of injection molding with machine 1 is substantially prevented.

The primary advantage of this invention is that an injection molding machine which uses a platen results in substantially flat and parallel mold mounting faces during clamp-up. Another advantage of this invention is that an injection molding machine is provided having a platen which is lightweight. Still another advantage of this invention is that an injection molding machine is provided which uses a platen designed to direct clamping force during clamp-up from the tie bars at the edges of the platen towards the central mold mounting area of the platen, eliminating any curvature of the platen, and improving molding. Still another advantage of this invention is that an injection molding machine is provided which uses a platen having a mold mounting face which stays almost completely flat during clamp-up and substantially prevents the formation of flash. And still a further advantage of this invention is that an injection molding machine is provided which uses a platen having two walls and an intermediate support structure which prevents the mold mounting side of the platen from non-uniformly deflecting during clamp-up. And yet another advantage of this invention is that an injection molding machine is provided which uses a platen having two walls and a central arch-shaped intermediate support structure between the two walls which substantially prevents non-uniform platen deflection of the mold mounting side thereof. And yet another advantage of this invention is that an injection molding machine is provided which uses a platen having two walls and an intermediate conically or spherically shaped support structure therebetween for substantially preventing non-uniform platen deflection at the molding side. Another advantage of the present invention is that an injection molding machine is provide which uses a mold platen for eliminating uneven loading of tie bars and nuts during clamp up. Since bending of the platen is minimized, the loading of the tie bars is substantially uniform and any resulting tie bar bending is substantially eliminated. Yet another advantage of this invention is that a method is provided for substantially eliminating the formation of flash during mold clamp up while injection molding.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for distributing forces within a platen having two parallel walls spaced apart by an intermediate support structure, which comprises:

providing a mold platen having two walls spaced from each other, with a first of said walls being on the mold side and a second of said walls being spaced from and parallel to said first wall, wherein each of said two walls have edges and a central area;

generating a force against at least one of said walls in a first direction, wherein said walls extend substantially transverse to said first direction; and directing said force from one of said walls solely towards the other of said walls from the central area of one of said walls towards the edges of the other of said walls via an intermediate support structure positioned between and connected to both of said walls, thereby substantially preventing deflection of said first wall.

2. A method according to claim 1, wherein said force is directed via an arch shaped support structure.

3. A method according to claim 1, wherein said force is directed via a conically shaped support structure.

4. A method according to claim 1, wherein said force is directed via a V-shaped support structure.

5. A method according to claim 1, wherein said force is directed via a C-shaped support structure.

6. A method according to claim 1, including the step of extending said support structure substantially outwardly from a center area of one wall towards edges of the other wall.

7. A method according to claim 1, wherein said walls have a width, including the step of extending said support structure across the entire width of at least one of said walls.

8. A method according to claim 1, including the step of extending said support structure outwardly from a central area of one wall at an acute angle to said one wall, and to the other wall at an acute angle to said other wall.

9. A method for reducing flash formation during injection molding, comprising the steps of:

forming a cavity mold between a stationary platen holding a first mold half and a movable platen holding a second mold half, wherein each of said stationary platen and said movable platen includes a first wall having edges and a central area and at least one of said platens further includes a second wall spaced from and substantially parallel to said first wall;

clamping said first mold half and said second mold half together;

generating a force having a first direction against said at least one platen substantially perpendicular to said at least one platen;

directing said force by means between said first and second walls from said central area of one of said walls of said at least one platen solely toward said edges of the other of said walls for substantially preventing deflection of said first wall and the formation of flash; and injection molding molten resin into said cavity mold and forming a molded part.

10. The process according to claim 9, further comprising positioning said first wall nearest said clamping operation.

11. The process according to claim 9, wherein said step of directing includes directing said force through an intermediate support structure positioned between said first wall and second wall.

12. The process according to claim 11, further including the step of receiving said molten resin through said first and second walls and through said intermediate support structure.

13. The process according to claim 11, further including the step of removing drool from said intermediate support structure resulting from said step of injection molding.

14. The process according to claim 9, wherein said directing includes the step of preventing a first side of said first wall from deflecting in a second direction transverse to said first direction.

15. The process according to claim 9, including the step of applying said step of directing to each of said stationary platen and said movable platen.

16. The process according to claim 9, wherein said second wall is attached to said first wall via an intermediate support structure, further including the step of generating mold clamping force adjacent at least one of said first and second walls.

17. A platen for use in a clamping operation, comprising:

a mold platen having two walls spaced from each other, with a first of said walls being on the mold side and a second of said walls being spaced from and parallel to said first wall, wherein each of said walls have edges and a central area; and an intermediate support structure positioned between and connected to both of said walls for directing force substantially perpendicular to said walls from one of said walls solely towards the other of said walls from said central area of one of said walls toward said edges of the other of said walls which substantially prevents deflection of said first wall, wherein said support structure has a narrow end and a wide end.

18. A platen according to claim 17, wherein said support structure is arch shaped.

19. A platen according to claim 17, wherein said support structure is conically shaped.

20. A platen according to claim 17, wherein said support structure is V-shaped.

21. A platen according to claim 17, wherein said support structure is C-shaped.

22. A platen according to claim 17, wherein said support structure is hollow.

23. A platen according to claim 17, wherein said support structure is one continuous wall.

24. A platen according to claim 17, wherein said support structure extends substantially outwardly from the central area of one wall towards the edges of the other wall.

25. A platen according to claim 17, wherein said walls have a width and wherein said support structure extends across the entire width of at least one of said walls.

26. A platen according to claim 17, wherein said support structure extends outwardly from the central area of one wall at an acute angle to said one wall, and to the other wall at an acute angle to said other wall.

27. A platen for use in a clamping operation wherein a force is generated in a first direction substantially perpendicular to said platen, comprising:

a mold platen having two walls spaced from each other, with a first of said walls being on the mold side and a second of said walls being spaced from and parallel to said first wall, wherein said first and second walls extend substantially transverse to said first direction of said force and wherein each of said first and second walls have edges and a central area; and means for directing said force from one of said walls solely towards the other of said walls from the central area of one of said walls towards the edges of the other of said walls for substantially preventing deflection of said first wall, wherein said means for directing comprises an intermediate support structure positioned between and connected to both of said walls.

28. A platen according to claim 27, wherein said support structure is arch shaped.

29. A platen according to claim 27, wherein said support structure is conically shaped.

30. A platen according to claim 27, wherein said support structure is V-shaped.

31. A platen according to claim 27, wherein said support structure is C-shaped.

32. A platen according to claim 27, wherein said support structure has a narrow end and a wide end.

33. A platen according to claim 27, wherein said support structure is one continuous wall.

34. A platen according to claim 27, wherein said support structure is hollow.

35. A platen according to claim 27, wherein said support structure extends substantially outwardly from a central area of one wall towards the edge of the other wall.

36. A platen according to claim 27, wherein said walls have a width and wherein said support structure extends across the entire width of at least one of said walls.

37. A platen according to claim 27, wherein said support structure extends outwardly from a central area of one wall at an acute angle to said one wall, and to the other wall at an acute angle to said other wall.

38. An injection molding machine, comprising:

a stationary platen holding a first mold half;

at least one movable platen holding a second mold half for forming a cavity mold with said first mold half;

means for guiding said movable platen relative said stationary platen;

means for clamping the mold halves together; and means for injection molding molten resin into said mold, wherein at least one of said stationary and movable platens substantially eliminates platen curvature during clamping, and wherein during clamping of said first and second mold halves a force is generated in said curvature eliminating platen having a first direction substantially perpendicular to said curvature eliminating platen, said curvature eliminating platen including a first wall having edges and a central area and at least first and second sides, wherein said first side is adapted to be positioned nearest said molding operation, said curvature eliminating platen further including a second wall spaced from and substantially parallel to said first wall, said first and second walls extending substantially transverse to said first direction of said force, and means between said first and second walls for directing said force from one of said walls solely towards the other of said walls from said central area of one of said walls toward said edges of the other of said walls for substantially preventing deflection of said first wall.

39. The injection molding machine according to claim 38, wherein said means for directing comprises an intermediate support structure positioned between and attached to said first and second walls.

40. The injection molding machine according to claim 39, wherein said intermediate support structure is defined by a substantially V-shaped support wall defining a cavity between said first and second walls.

41. The injection molding machine according to claim 39, wherein said intermediate support structure is defined by a substantially arch-shaped support wall defining a cavity between said first and second walls.

42. The injection molding machine according to claim 41, further including means for receiving said means for injection molding through said first and second walls and through said intermediate support structure.

43. The injection molding machine according to claim 42, wherein said first and second walls have openings therein leading to said cavity, wherein said openings and said cavity are adapted to receive said means for injection molding.

44. The injection molding machine according to claim 42, wherein said second wall includes means for removing drool from said cavity resulting from a molding operation using said means for injection molding.

45. The injection molding machine according to claim 44, wherein said means for removing comprises an inner surface of said arch-shaped support wall leading to a purge hole through said second wall for allowing said drool to escape said cavity.

46. The injection molding machine according to claim 39, wherein said at least one platen further includes means for being guided on said means for guiding.

47. The injection molding machine according to claim 39, wherein said intermediate support structure is defined by a support wall having a substantially C-shaped cross-section.

48. The injection molding machine according to claim 39, further comprising said intermediate support structure defined by an arch-shaped support wall having a narrow end and a wide end, wherein said first wall is attached with said narrow end and said second wall is attached with said wide end.

49. The injection molding machine according to claim 48, wherein said second side of said first wall is attached to said narrow end opposite said first side.

50. The injection molding machine according to claim 39, wherein said first wall is adapted to support said first mold half for engagement with said second mold half for forming said mold.

51. The injection molding machine according to claim 39, wherein said intermediate support structure comprises a plurality of ribs attached to and between said first and second walls and oriented at acute angles to said first and second walls.

52. The injection molding machine according to claim 51, wherein said at least one of said stationary and movable platens has a width and said plurality of ribs include an upper rib and a lower rib extending across the width of said at least one of said stationary and movable platens.

53. The injection molding machine according to claim 52, wherein said second side of said first wall has a central area and said second wall includes upper and lower edges, and wherein said upper rib extends from said central area to said upper edge and said lower rib extends from said central area to said lower edge.

54. The injection molding machine according to claim 53, wherein said upper and lower ribs form an arch-shaped intermediate support structure.

55. The injection molding machine according to claim 53, wherein said upper and lower ribs form an arch-shaped intermediate support structure.

56. The injection molding machine according to claim 39, wherein said intermediate support structure is defined by a conically shaped wall.

57. The injection molding machine according to claim 38, wherein said means for directing is operative to prevent said first side of said first wall from deflecting in a second direction transverse to said first direction.

58. The injection molding machine according to claim 38, wherein each of said stationary and movable platen comprises a platen that substantially eliminates curvature.

59. The injection molding machine according to claim 39, wherein said first and second wall and said intermediate support structure form a hollow, symmetrical structure.

60. The injection molding machine according to claim 39, wherein said intermediate support structure is attached to said first and second walls.

61. The injection molding machine according to claim 38, wherein said mold is adjacent said first wall.

62. The injection molding machine according to claim 61, wherein said means for injection molding is a molten resin injection unit.

63. The injection molding machine according to claim 62, further including means for generating mold clamping force adjacent at least one of said walls.

64. The injection molding machine according to claim 38, wherein said means for guiding comprise tie bars.

65. The injection molding machine according to claim 64, wherein said tiebars pass through at least one of said walls with a clearance between said tiebars and said at least one of said walls.

66. The injection molding machine according to claim 39, wherein the intermediate support structure is defined by a support having an outer surface forming an acute angle with respect to said first direction of said force.

* * * * *

UNITED STATES PATENT AND TRADEMARK OFFICE
CERTIFICATE OF CORRECTION

PATENT NO. : 5,776,402
DATED : July 7, 1998
INVENTOR(S) : Pierre Glaesener

It is certified that error appears in the above-identified patent and that said Letters Patent is hereby corrected as shown below:

Please amend the title to read as follows:

--INJECTION MOLDING MACHINE HAVING A NON-DEFLECTION PLATEN AND PROCESS FOR PREVENTING FLASH FORMATION--.

Signed and Sealed this

Twenty-third Day of February, 1999

Attest:

Q. TODD DICKINSON

Attesting Officer     Acting Commissioner of Patents and Trademarks